(12) United States Patent
Pieczul et al.

(10) Patent No.: US 9,092,609 B2
(45) Date of Patent: *Jul. 28, 2015

(54) AUTHENTICATING A RICH CLIENT FROM WITHIN AN EXISTING BROWSER SESSION

(71) Applicant: International Business Machines Corporation, Armonk, NY (US)

(72) Inventors: Olgierd S. Pieczul, Dublin (IE); Mark M. McGloin, Dublin (IE); Mary E. Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,424

(22) Filed: Oct. 2, 2012

(65) Prior Publication Data

US 2013/0047235 A1    Feb. 21, 2013

Related U.S. Application Data

(63) Continuation of application No. 13/178,633, filed on Jul. 8, 2011.

(51) Int. Cl.
*H04L 9/32* (2006.01)
*G06F 21/41* (2013.01)
(Continued)

(52) U.S. Cl.
CPC ............... *G06F 21/41* (2013.01); *H04L 63/08* (2013.01)

(58) Field of Classification Search
CPC . H04L 63/08; H04L 29/08981; H04L 9/3226; G06F 21/31
USPC .......................... 709/203, 217, 219; 716/2–26
See application file for complete search history.

(56) References Cited

U.S. PATENT DOCUMENTS

| 7,725,605 B2 | 5/2010 | Palmeri et al. |
| 7,734,686 B2 | 6/2010 | Wilson et al. |
| 8,296,828 B2 * | 10/2012 | Dalzell et al. ............ 726/6 |

(Continued)

FOREIGN PATENT DOCUMENTS

JP    2006236281    7/2006

OTHER PUBLICATIONS

Sun et al, "OpenID Enabled Browser: Towards Fixing the Broken Web Single Sign-On Triangle," DIM '10, Oct. 8, 2010.

(Continued)

*Primary Examiner* — Michael Chao
*Assistant Examiner* — Shiuh-Huei Ku
(74) *Attorney, Agent, or Firm* — Jeffrey S. LaBaw; David H. Judson (57) ABSTRACT

A user authenticates to a Web- or cloud-based application from a browser-based client. The browser-based client has an associated rich client. After a session is initiated from the browser-based client (and a credential obtained), the user can discover that the rich client is available and cause it to obtain the credential (or a new one) for use in authenticating the user to the application (using the rich client) automatically, i.e., without additional user input. An application interface provides the user with a display by which the user can configure the rich client authentication operation, such as specifying whether the rich client should be authenticated automatically if it detected as running, whether and what extent access to the application by the rich client is to be restricted, if and when access to the application by the rich client is to be revoked, and the like.

12 Claims, 4 Drawing Sheets

(51) Int. Cl.
*H04L 29/06* (2006.01)
*G06F 21/31* (2013.01)

(56) References Cited

U.S. PATENT DOCUMENTS

| | | | |
|---|---|---|---|
| 2005/0055458 A1* | 3/2005 | Mohan et al. | 709/238 |
| 2006/0031407 A1 | 2/2006 | Dispensa et al. | |
| 2007/0282965 A1 | 12/2007 | Kataoka | |
| 2008/0243854 A1* | 10/2008 | Noguchi | 707/9 |
| 2010/0057836 A1* | 3/2010 | Anbuselvan | 709/203 |
| 2011/0219427 A1 | 9/2011 | Hito et al. | |
| 2012/0079585 A1* | 3/2012 | Chan et al. | 726/10 |
| 2012/0151568 A1 | 6/2012 | Pieczul | |

OTHER PUBLICATIONS

Boernig et al, "IBM Workplace Managed Client 2.6 on Linux," Apr. 2006.

International Search Report, PCT/CA2012/050461, Nov. 1, 2013.

* cited by examiner

AUTHENTICATING A RICH CLIENT FROM WITHIN AN EXISTING BROWSER SESSION

BACKGROUND OF THE INVENTION

1. Technical Field

This disclosure relates generally to application security and, in particular, to a method to enable the passing or obtaining of a credential for a "rich client" from within an existing web browser session.

2. Background of the Related Art

It is known in the prior art to integrate Web- or cloud-based applications with so-called "rich" clients, where a "rich" client is a client (of a client-server application) that supports its own interface (as opposed to merely exporting the web interface from the web application itself). A "rich" client typically is not browser-based, and it is sometimes referred to as a "thick" (as compared to a browser-based or "thin") client. An illustrative rich client is Lotus Notes®, which provides email, calendaring, contact management, and instant messaging. A rich client can be used to access and automatically perform actions on behalf of a user.

Many non-browser-based (rich) client applications of this type also have browser-based (thin client) application counterparts or features. The thin client may be a simple web browser and a login page. When an end-user wants to use these multiple clients at the same time from a single workstation, he or she must authenticate separately to an authorization server. A common approach to this requirement is to use a password that is then entered in multiple interfaces, e.g., one for each client. This approach is not user-friendly, as the user needs to enter his or her password multiple times. Moreover, where the user stores the password locally (in each client), it increases the risk of compromise given that multiple copies are stored. Further, when the user changes the password, it likewise must be changed in multiple places. Of course, when a user is forced to enter a password multiple times, it is more likely than not that the user will select a weak one. Another problem arises if the Web- or cloud-based application uses a single sign-on protocol (such as SAML or OpenID) that does not support password-based authentication that is typical for the thin client approach. In such case, the user is then forced to use distinct types of authentication credentials and techniques for each of the thick and thin clients, creating further inefficiencies and security risks.

It would be desirable to be able to provide a technique by which a user need only authenticate once during a session with a Web- or cloud-based application, but wherein this authentication can be propagated, or otherwise made available, to an associated rich client that can be discovered by the user.

BRIEF SUMMARY OF THE INVENTION

According to this disclosure, a user authenticates to a Web- or cloud-based application from a thin (browser-based) client. The client has an associated rich client. After a session is initiated from the browser-based client (and a credential obtained), the user can discover that the rich client is available and cause it to obtain the credential (or a new one) for use in authenticating the user to the application (using the rich client) automatically, i.e., without additional user input. An application interface provides the user with a display by which the user can configure the rich client authentication operation, such as specifying whether the rich client should be authenticated automatically if it detected as running, whether and what extent access to the application by the rich client is to be restricted, if and when access to the application by the rich client is to be revoked, and the like.

In one embodiment, to facilitate the described operation a control channel is established between the browser and the rich client, which is modified to include an HTTP server. By sending an HTTP request to a port on a localhost connection to the HTTP server, the browser can determine if the rich client is executing and then pass the browser-based credential.

In an alternative embodiment, the control channel is implemented using standard operating system mechanisms. In particular, the rich client registers a content type in the operating system and establishes itself as a handler for that type. When it is required to initiate the rich client authentication, the browser makes an HTTP request to the application, requesting a new credential. The HTTP response includes the credential with mime type that matches the content type registered. The new credential is then passed through the operating system to the rich client, which then uses it to authenticate to the application.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
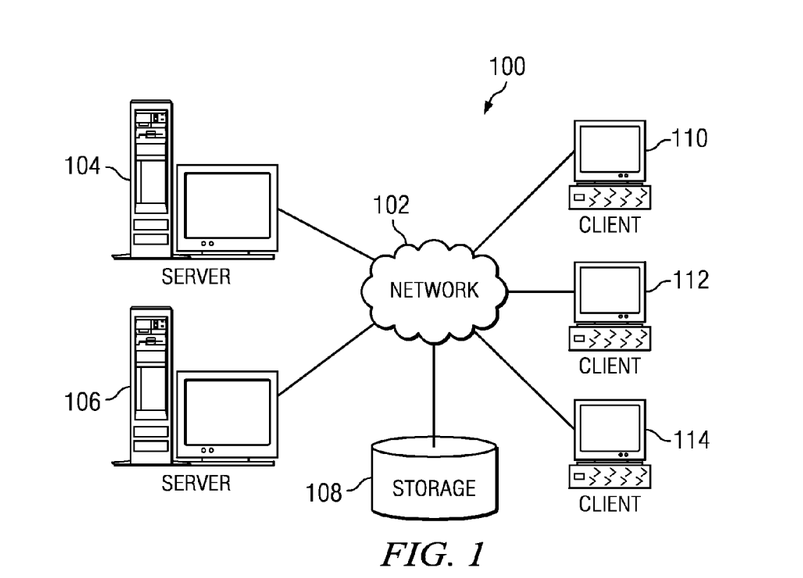
FIG. 1 depicts an exemplary block diagram of a distributed data processing environment in which exemplary aspects of the illustrative embodiments may be implemented.
Figure 2:
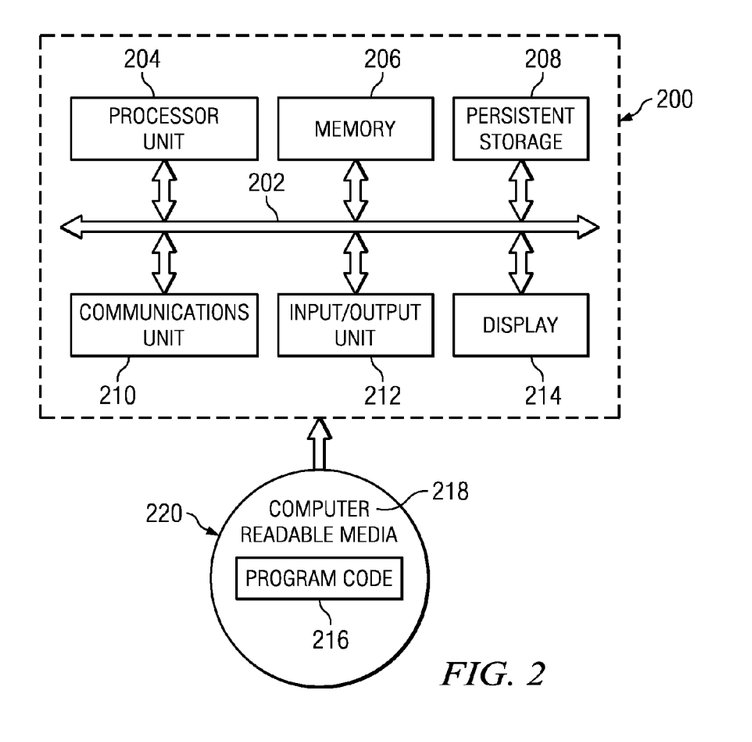
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As is well-known, and by way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. Typically, an authentication is presented by a user as part of an authentication protocol sequence with an authentication server or service.

Figure 3:
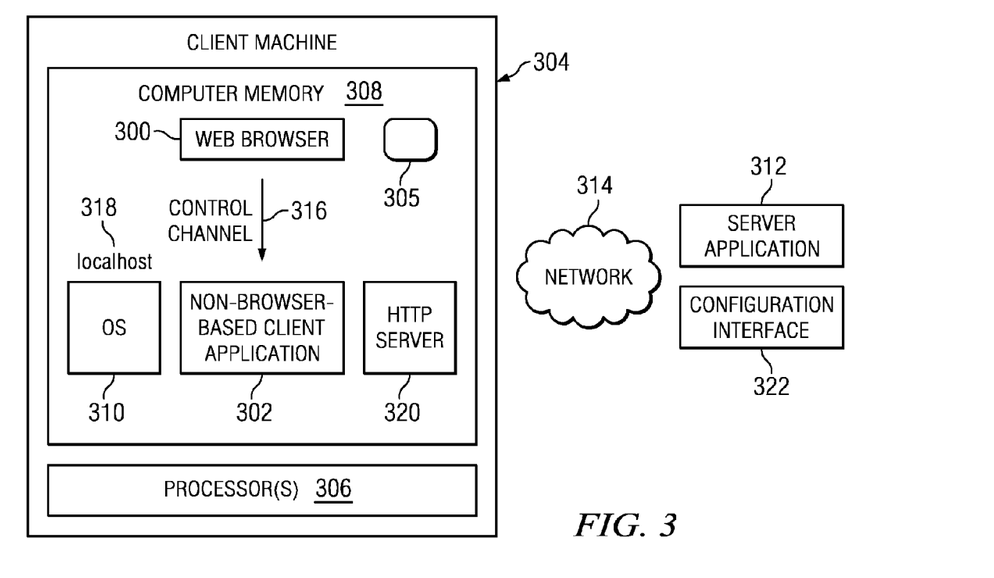
FIG. 3 illustrates a client application and its associated Web- or cloud-based server application in which the technique of this disclosure is implemented.

As will now be described, and with reference to FIG. 3, the technique that is the subject of this disclosure typically is implemented in a scenario in which a Web- or cloud-based application comprises client-side and server-side components. The client-side components comprise a web browser or code associated therewith (e.g., a browser plug-in, applet, or the like) 300, and non-browser-based client 302, each of which executes in client machine 304, such as described above with respect to FIG. 2. For example, client machine 304 comprises processor 306, computer memory 308, and operating system 310. The browser-based client may be referred to herein as a "thin" client, and the non-browser-based client may be referred to as a "thick" or "rich" client. Each such client component is adapted to interoperate with the server-side component comprising server application 312 over network 314, such as shown in FIG. 1. Server application 304 may be either Web-, or cloud-based and it also executes on one or more machines such as shown in FIG. 2.

Browser-based client 300 has an established authentication mechanism with its associated server application 312. Likewise, non-browser-based or "rich" client 302 has an established authentication mechanism with the server application 312. These authentication mechanisms may be the same or different. As noted above, a "rich" client is not browser-based. An illustrative rich client application is Lotus Notes®, which provides email, calendaring, contact management, and instant messaging, although rich clients can be implemented in any client-server application. In this example, the server application 304 is Domino® data server. Of course, these examples are not meant to limit the disclosed subject matter, which may be implemented with any Web- or cloud-based application.

According to this disclosure, a control channel 316 is established between the browser-based client 300, on the one hand, and the non-browser-based client 302, on the other hand. The control channel is used to pass information between these components, as will be described. In one embodiment, control channel 316 is implemented using a localhost connection 318, over which the browser-based client 300 communicates with an HTTP server instance 320 associated with the rich client. Communications between the client 300 and client 302 in this embodiment typically occur over HTTPS, although this is not a requirement. In an alternative embodiment, and as will be described, the control channel is implemented using the operating system 310 itself, e.g., by having the rich client register as a handler for a particular mime type. The control channel may be implemented in other ways, e.g., as a shared memory segment, an interprocess communication (IPC), by a network call, by a file, or the like. In the event the control channel is observable by other client processes, it should be secured using known techniques.

Figure 4:
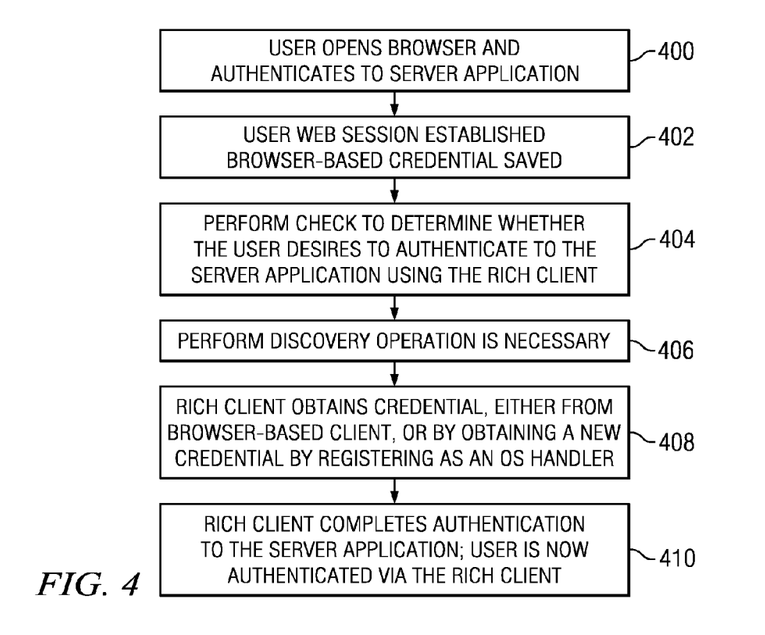
FIG. 4 is a process flow diagram describing the basic operating scenario of this disclosure.

A typical operating scenario of this disclosure is now described with respect to the process flow in FIG. 4. At step 400, an end user has opened an instance of the browser 300 and has authenticated to the server application 312, typically by entering a user identifier (UID), and a password, at an SSL-secured logon page rendered in the browser. As a result, the browser obtains and stores an associated credential 305, which is provided by the server application. This operation as indicated at step 402 establishes a user session or "web-based user session." As a consequence, the user can then take one or more actions as permitted by the Web- or cloud-based application. According to this disclosure, after the user session is initiated from the browser (i.e., during the existing web session), the rich client 302 is discovered and is authenticated to the server application 312, preferably automatically and without requiring the end user to input additional authenticated-related information. In other words, the rich client authentication is carried out transparently—in effect "under the covers"—but in the manner expected by the server application. The end user, however, does not need to perform the usual tasks associated with the authentication operation from the rich client. He or she authenticates once (using the browser-based approach), and that authentication enables or facilitates the rich client-based authentication.

Preferably, this rich client automatic logon (auto-logon) operation is accomplished as follows. It assumes that the user (or another) has configured certain discovery and authentication operations, preferably using an application interface that is described below. At step 404, a check is performed to determine whether the user desires to authenticate to the server application using the rich client. If the user desires to authenticate to the server application, a discovery step 406 is performed. Discovery step 406 identifies if any rich client(s) are executing in the client machine (and there may be many of them). The discovery step may be performed actively, e.g., by having the browser issue one or more requests over the localhost connection and receiving "status" responses in return, or it may be carried out passively, e.g., by having such status information available to the browser and displayable on-demand. In the alternative, when a rich client is started, its execution state is just exposed to the user in some manner, e.g., audibly, visually, or the like. The nature of the discovery process will depend on the implementation. Other discovery techniques that might be used include having the rich client open a port on an HTTP server instance and having the browser iterate over a set of available ports until it locates the open port, which indicates that the rich client is executing. Where IPC is used as the control channel, an operating system publish mechanism may be used to provide a notification that the rich client is executing. These examples are not meant to be limiting.

Following discovery, the routine continues at step 408, in which the rich client obtains a credential to perform the actual authentication to the server application. In one embodiment, the credential is just the credential 305 obtained during the browser-based authentication to the application server. In this embodiment, the browser simply passes the credential to the rich client via the control channel. In an alternative embodiment, the rich client has registered as a handler to the local operating system for a mime content type (e.g., x-application/rich-auth). At step 408, the browser issues an HTTP request to the server application requesting a new credential; the HTTP response from the server application includes the new credential and a header that identifies the associated mime type. Because the rich client is registered as a handler for this mime type, the HTTP response (the new credential) is propagated through the operating system kernel to the rich client, which then uses it to authenticate, once again without requiring explicit user input. In this alternative embodiment, the control channel uses the standard OS mechanisms and thus is platform-independent. At step 410, the rich client completes the authentication to the server application and the process terminates.

One or more steps shown in FIG. 4 may be carried out in a different order. One or more steps may be combined, or a substitution may be implemented.

The particular manner in which the rich client authenticates to the server application 312 is not an aspect of this disclosure. Known techniques for this purpose include, without limitation, SAML-based authentication (in which the server issues a SAML assertion that is then forward to the rich client, which authenticates with the assertion or exchanges it for another credential), OAuth-based authentication (in which the server issues an OAuth token that is used by the rich client to authenticate), one-time token-based authentication (in which the server generates a random nonce that is kept server-side and associated with the user), and the like.

In the first embodiment, wherein the browser-based client 300 communicates with the rich client directly over the control channel, the server application and the local HTTP server (executing in association with the rich client) may operate in different domains. The local HTTP server may be an adjunct to the rich client, or integral therewith. Accordingly, known cross-domain communication methods (e.g., script inclusion) should be used to facilitate this interaction. In another variant, rather than using a local HTTP server, a browser plug-in or signed applet may be used to interact with the application server to obtain the credential and implement the rich client authentication.

Figure 5:
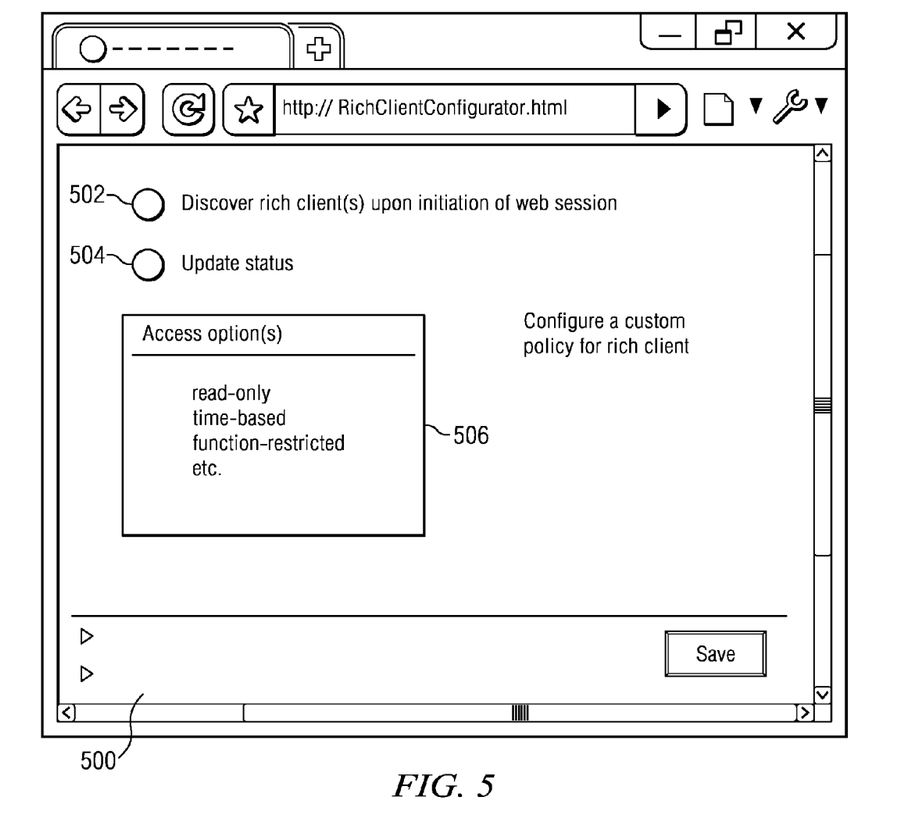
FIG. 5 is a display page from an application interface by which a user configures an access policy according to this disclosure.

FIG. 5 illustrates a representative application interface 322 (FIG. 3) by which a user (or other person or entity) may configure the operation. This interface may be exported to the browser as one or more web pages, although this is not a limitation. A representative page 500 exposes a set of configuration elements, such as input fields, HTML fill-in forms, radio buttons, and the like. Thus, for example, by selecting radio button 502, the user can request that all running rich clients be discovered upon initiation of the web session. By selecting radio button 504, the user can elect to have the status of all running rich clients updated on request. The user may select radio button to specify that the rich client is authenticated automatically when it is detected as running. Using options available from list 506, the user can specify a restriction or limitation on how the rich client interacts with the server application. Thus, for example, the list may expose one or more options, e.g., the access is "read-only," that access is available for a limited time that may be specified, that only certain functions or application programming interfaces (APIs) are available, and so forth. These are merely representative configuration options, and one of ordinary skill will appreciate that other configuration options may be implemented as desired. The configuration interface may also provide a control that, once selected, enables the user to start the rich client directly from the browser if that client is not running. Using this interface, the user configures a "policy" that defines how the rich client should be authenticated to the server application. A set of default policies may be exposed to a user to facilitate this option. While an embodiment of the interface has been described, one or more alternative approaches may be used, e.g. using a command line interface, defining a policy programmatically, or the like.

Figure 6:
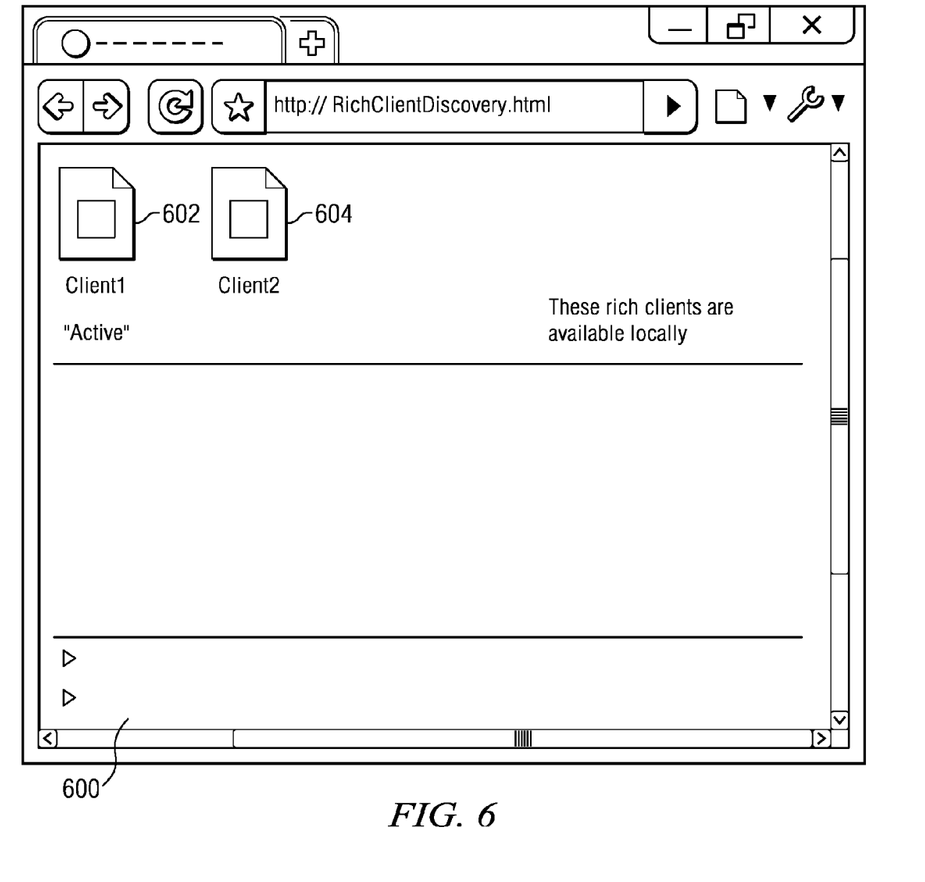
FIG. 6 is a display page from the application interface by which the user initiates the rich client authentication operation, or revokes a previously-authorized access.

FIG. 6 illustrates a discovery page 600 of the interface. This page is displayed after the discovery step as previously described. In this example, the discovery operation has identified two rich clients (Client1, and Client2) that are executing in the client machine, and these clients are represented here by icons 602 and 604. Icon 602 includes an indication or visual cue that a credential has been issued for Client1 associated therewith. By selecting that icon, the end user may be afforded an opportunity (e.g., via a separate dialog) to invalidate Client1's authentication; in the alternative, selection of icon 602 itself terminates the rich client authentication. In either case, access to the server application from the rich client is effectively revoked (by invalidating the credential). By selecting icon 604, the end user can initiate the process of obtaining the credential, as described above, so Client2 can access and use the server application.

Thus, according to this technique, a user can enable a rich client to authenticate to the server application automatically, and based on a policy defined by the user. This policy may specify that the credential can be issued only for a particular time period, or that it only be used to access a part of the application, or the like. Access is revocable, once again under the user's configured policy.

The disclosed subject matter has many advantages. A key advantage is the user need only authenticate once during a session with a Web- or cloud-based application (and in one place). Using the described technique, this authentication is then, in effect, used to enable an associated rich client to access the application. Another advantage is that such access by the rich client can be customized according to a user-configured policy, and the user can revoke such access by the rich client as desired. Using the discovery feature, the user can view the rich clients running locally and authenticate them by requesting the server application (or other entity) issue a credential (or token, or the like), which credential is then used by the rich client to authenticate the user to the application. The technique provides several local mechanisms for propagating an existing browser-based credential to the rich client, or enabling the rich client to obtain a new credential.

The technique may be used with any rich client, irrespective of how that client authenticates to the server application.

In one described embodiment, the technique enables automatic and direct propagation of a (browser-based) client application credential to a counterpart non-browser process that is associated with the browser application. This solution obviates the user having to log into the rich client if it is desired to launch that client within an existing web-based user session.

As used herein, the "credential" should be broadly construed to refer to any credential, token, data set or data that facilitates access to the server application. As noted above, the client (whether browser-based or rich) has an established authentication mechanism with its associated server application, and the disclosed technique honors the semantics and communication protocols involved.

The auto-login solution of this disclosure provides a unique interaction between the browser-based client and the associated rich client, both of which preferably are associated with the Web- or cloud-based server application. The solution assumes that an existing user session between the browser-based client and the server application is in place, in other words, that a credential has been previously generated when the end user logged into the server application.

Although not meant to be limiting, in a representative embodiment, the server application executes an application server (such as IBM® WebSphere® server), which includes support for one or more server-based code functions, typically in the form of J2EE-compliant servlets.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The rich client auto-login scheme described herein may be implemented in or in conjunction with various server-side architectures including simple n-tier architectures, web portals, federated systems, and the like. The application server component may be located in a domain that differs from the domain of one or more back-end applications and, thus, the techniques herein may be practiced in a loosely-coupled server (including a "cloud"-based) environment. The application server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the auto-login functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the client and server components as described are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the components that provide the rich client auto-login functionality.

The function(s) described may be implemented as an adjunct or extension to an existing application server function or operation.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, as noted above, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

As noted, the above-described rich client auto-login function may be used in any system, device, portal, site, or the like wherein a non-browser based client application credential needs to be passed to an associated browser process. More generally, the described technique is designed for use in any operating environment wherein given information (including, without limitation, credential data) is desired to be persisted from a client application to an associated browser process in an automated manner.

While the embodiment described above provides for authenticating a rich client from within an existing browser session, the basic technique also may be implemented in the scenario where the rich client is authenticated to the web application and it is desired to pass the existing credential to the thin client. In this scenario, and provided that the rich client has a way to ensure that access (to the application) by the thin client is permissible, a control channel is enabled between the rich client and an available browser-based client. The credential obtained by the rich client is then passed to the browser-based client to enable the user to be authenticated.

The server application enables access to a service, a server, an application program, a process, a page (e.g., a wiki, a web page, etc.), a file, a linked object, a directory, or the like.

Having described our invention, what we now claim is as follows:

1. A method of authenticated user access to a server application, comprising:
   receiving user input in a browser-based client to initiate a web session with the server application;
   receiving a credential at the browser-based client;
   within the web session, identifying a rich client capable of interacting with the server application;
   within the web session, providing the rich client with a credential, the credential being one of: the credential received at the browser-based client, and a new credential received from the server application; and
   within the web session, using the credential provided to the rich client to authenticate the user to the server application using the rich client;
   wherein at least one of the receiving, identifying, providing and using steps is carried out in software executing in a hardware element.

2. The method as described in claim 1 wherein the step of identifying the rich client includes initiating a discovery operation to determine an operating state of one or more rich clients executing locally.

3. The method as described in claim 2 further including:
   providing the user a display indicating the one or more rich clients executing locally; and
   receiving a selection from the user identifying the rich client that is to be provided with the credential.

4. The method as described in claim 1 further including establishing a control channel between the browser-based client and the rich client.

5. The method as described in claim 4 further including providing the rich client with the credential using the control channel.

6. The method as described in claim 1 wherein the credential provided to the rich client is associated with a policy that defines at least one access restriction with respect to the server application.

7. The method as described in claim 6 wherein the policy is a user-configured policy.

8. The method as described in claim 1 further including invalidating the credential provided to the rich client.

9. A method to facilitate access to a server application by a second client from within a user session initiating by a first client, wherein the first and second clients are co-located, comprising:

establishing a control channel between the first and second clients, wherein at least one of the clients is a non-browser-based client;

while the user session is on-going, discovering that the second client is available to interact with the server application;

providing the second client a credential; and using the credential to authenticate the user to the server application using the second client;

wherein at least one of the establishing discovering, providing and using steps is carried out in software executing in a hardware element.

10. The method as described in claim 9 wherein the first client is a browser-based client, and the second client is a non-browser-based client.

11. The method as described in claim 9 wherein the credential provided to the second client is a credential obtained by the first client when the user session is initiated.

12. The method as described in claim 9 wherein the credential provided to the second client is obtained by registering the second client to receive a response from the application server, the response including the credential.

\* \* \* \* \*